United States Patent [19]

Ward

[11] Patent Number: 4,653,844
[45] Date of Patent: Mar. 31, 1987

[54] PRISM COUPLERS

[75] Inventor: Kevin D. Ward, Essex, England

[73] Assignee: International Standard Electric Corporation, New York, N.Y.

[21] Appl. No.: 651,005

[22] Filed: Sep. 14, 1984

[30] Foreign Application Priority Data

Sep. 20, 1983 [GB] United Kingdom ............... 8325099

[51] Int. Cl.[4] .................. G02B 6/26; G02B 6/42
[52] U.S. Cl. ................... 350/96.15; 350/96.19
[58] Field of Search ............ 350/96.15, 96.16, 96.19, 350/286, 287

[56] References Cited

U.S. PATENT DOCUMENTS 3,584,230 6/1971 Tien ..................... 350/96.19
4,514,050 4/1985 Stites .................... 350/286

Primary Examiner—William L. Sikes
Assistant Examiner—Robert E. Wise
Attorney, Agent, or Firm—John T. O'Halloran; Thomas F. Meagher

[57] ABSTRACT

Prism couplers are manufactured by disposing a prism (10) on an optically flat waveguide (11) such that the region therebetween is shaped for substantially optimum coupling of optical energy therebetween, and securing the prism to the waveguide without deformation of the waveguide. The prism may have a curved, for example part-cylindrical, base (FIG. 4) or be separated from the waveguide by appropriate spacers (FIGS. 5 or 6). The prism may be secured to the wavegudie by an optical epoxy compound.

6 Claims, 8 Drawing Figures

PRISM COUPLERS

This invention relates to prism couplers for coupling light into and out of optical waveguides, and to methods of manufacturing prism couplers.

Figure 1:
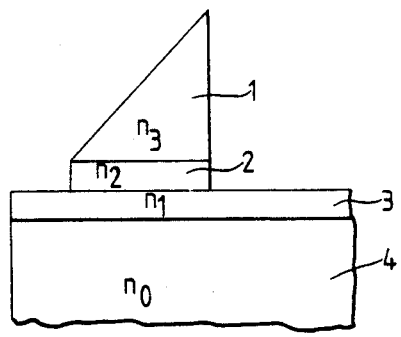

Of several methods employed for coupling light into and out of optical waveguides, the prism coupler is the most widely used. Basically, and as illustrated in FIG. 1, it comprises a prism 1, an intermediate layer 2 and a waveguide 3, the latter being arranged on a substrate 4. The refractive index of the substrate 4 is $n_o$, that of waveguide 3 is $n_1$, that of layer 2 is $n_2$ and that of the prism 1 is $n_3$. The prism is made from a material of higher refractive index than the waveguide, and the intermediate layer 2 is of a material of a lower refractive index than the waveguide, the layer is often comprised by an air gap. For the coupler to work $n_3 > n_1 > n_o$ and $n_2$.

Light which is totally-internally-reflected from the prism-layer interface has an associated evanescent field which penetrates through the layer and into the waveguide. A coupled waveguide situation is thus developed in which light energy is transferred into or out of the surface guide 3.

The performance of prism couplers depends in a complicated manner on several factors which we have found difficult to control. Although very high efficiency (>90%) prism couplers have been reported, coupling regions tend to be difficult to produce consistently, especially for large aperture devices (i.e. $\gtrsim 10$ mm).

Figure 2A:
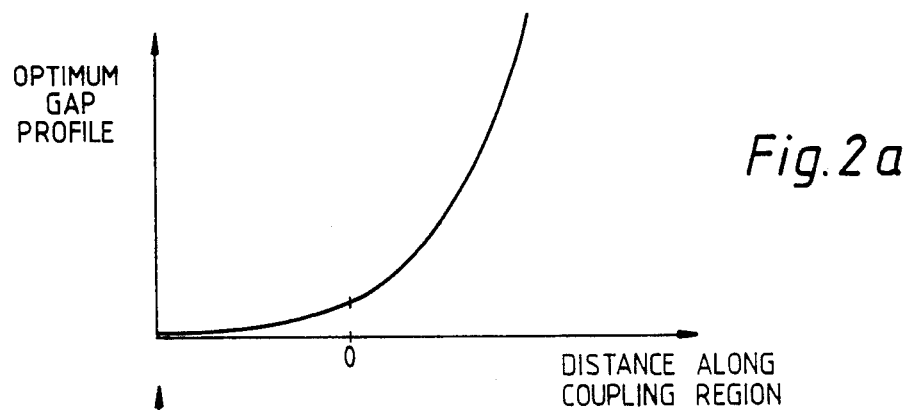

A major difficulty when trying to make couplers is to be able to form, controllably, the layer, or gap, between the prism and waveguide. Ideally the layer, or gap, should be tapered as illustrated in FIG. 2a for the Gaussian input beam power distribution illustrated in FIG. 2b. Most conventional prism couplers deform the waveguide substrate elastically in some way in order to form the profile. For instance, in one known design aas illustrated in FIG. 3, a flat based prism 5 and a waveguide 6 on substrate 7 are forced together between two anvils 8 and 9. A narrow gap is formed in the region around the common axis of the anvils where the waveguide substrate has been deformed, thus forming a coupling region. Prism couplers of this type must use waveguides which can be deformed without breaking and, in general, this means using "thin" waveguide substrates. Unfortunately, such substrates are susceptible to warping and tend not to be optically flat. For example, a 0.5 mm×26 mm×45 mm y-cut LiNbO$_3$ substrate that we have measured was flat to only ±1 μm along the 26 mm, Z axis. Indeed, if the waveguide and prism surfaces were flat and could be brought together to within about half the wavelength of light being used, a coupling region over the whole base of the prism would be formed, and this has not been observed. In order to form a coupling region a prism and waveguide normally have to be pressed together using a force of several kilograms, most of which is required to flatten the waveguide surface. The process, however, is unrepeatable, and the high force necessary to form the coupling regions is undesirable as the waveguide or prism surfaces can be damaged under high stress conditions and even fracture of the substrate can be caused. The high stress concentration around coupling regions may initiate microcracks which would adversely affect the efficiency of the prism coupler and increase optical losses in the waveguide. In addition, in order to achieve the required pressing together of the prism and waveguide a relatively complex and expensive mounting arrangement is required.

In order to minimise the cost of prism couplers it is desirable to obviate the need for the complex mounting arrangements and whilst the prism could be simply bonded to the waveguide, using an optical epoxy compound or another bonding agent, the large pressures (of the order of 1 kg.mm$^{-2}$) required to form the coupling regions for the prism couplers described above would make this difficult to achieve.

Whilst various prism couplers are known they are expensive to produce, do not have properly controllable performance and are complex structures.

The present invention is thus directed towards producing practical coupler structures, the performance of which can be properly controlled, for coupling light to or from optical planar waveguides made in LiNbO$_3$, or other forms of waveguides such as stripe guides and guides made using materials other than LiNbO$_3$, including those working outside of the visible spectrum.

According to one aspect of the present invention there is provided a method of manufacturing a prism coupler including the steps of disposing a prism on the surface of an optically flat waveguide such that the region therebetween is shaped for substantially optimum coupling of optical energy therebetween and securing the prism to the waveguide without causing deformation of the waveguide.

According to another aspect of the present invention there is provided a prism coupler including an optically flat waveguide, a prism disposed on the surface of the waveguide such that the region therebetween is shaped for substantially optimum coupling of optical energy therebetween and means securing the prism to the waveguide without causing deformation of the waveguide.

Figure 3:
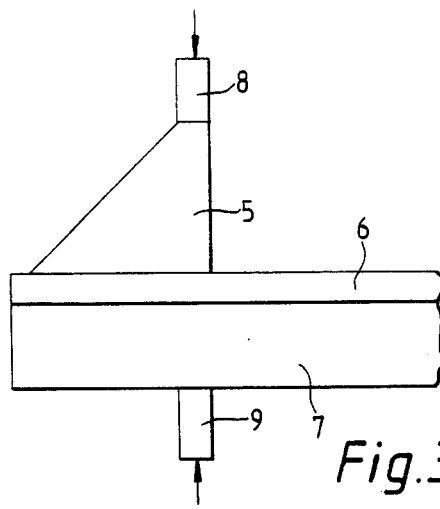
Figure 2B:
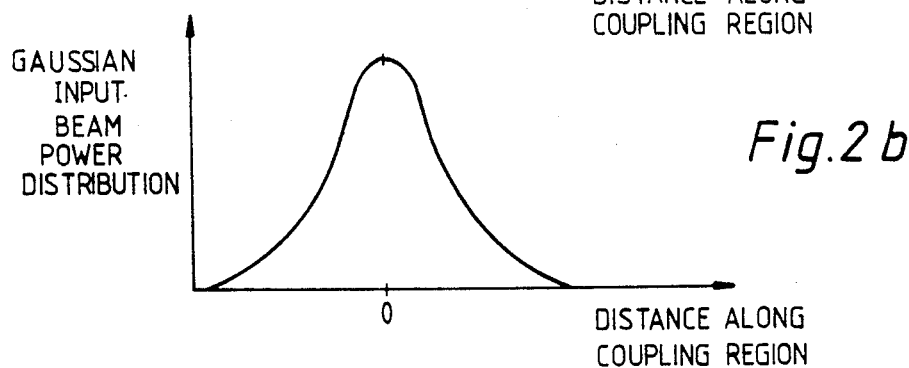
Figure 4:
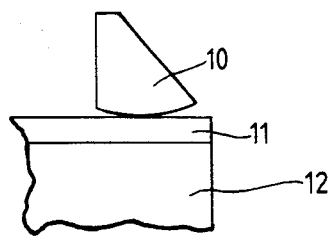
Figure 5:
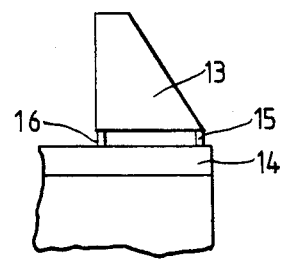
Figure 6:
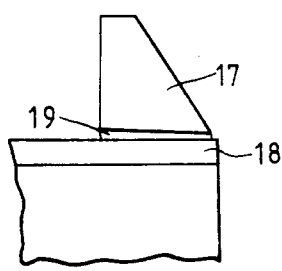
Figure 7:
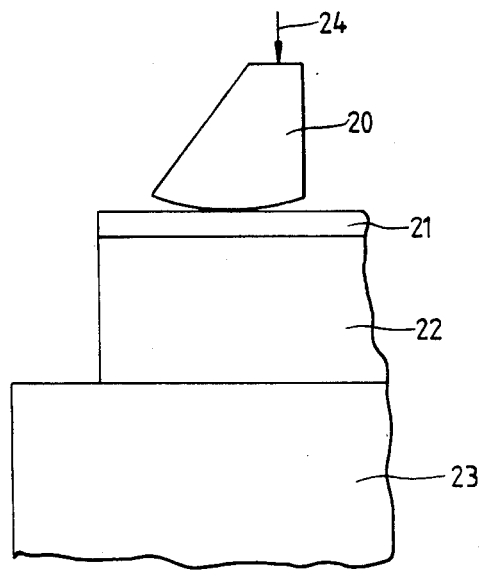

Embodiments of the invention will now be described with reference to the accompanying drawings, in which:

FIG. 1 illustrates a basic conventional prism coupler,

FIGS. 2a and 2b, respectively, illustrate optimum gap profile and Gaussian input beam power distribution relative to the distance along the coupling region, FIG. 3 illustrates another conventional prism coupler, FIGS. 4, 5 and 6 illustrate coupler structures proposed by the present invention, and FIG. 7 illustrates, schematically, a practical coupler structure employing the structure of FIG. 4.

In order to produce the necessary gap, rather than by applying pressure between the prism and the waveguide to deform the waveguide, in the structures of the present invention the waveguide surface is kept optically flat in the region where the prism and the waveguide are to be in "contact". The contact is generally not attainable since dust particles and surface irregularities will keep the prism and the waveguide apart by a fraction of a micron. The surface of the waveguide is required to be optically flat in order to avoid high mechanical stresses in the coupling region. The gap is formed by shaping the base of the prism or by using spacers placed between the prism and the waveguide, in order to form a region between the prism and the waveguide which is shaped for substantially optimum coupling. Spacers may be provided by means of thin films of, for example, evaporated aluminium, deposited on the waveguide or prism surface. The surface of the waveguide is required to be optically flat in order to avoid high mechanical stresses in the coupling region. The coupler structure illustrated in FIG. 4 employs a prism 10 with a curved base disposed on a waveguide 11 provided on a substrate 12. In FIG. 5 is shown a coupler structure comprising a prism 13 separated from a waveguide 14 by a gap defined by spacers 15 and 16. FIG. 6 shows a coupler structure comprising a prism 17 separated from a waveguide 18 by a tapered spacer 19. In both cases the spacers may be formed on either the prism and/or waveguide. Since the gap is not produced by material deformation a large force is not required to press the prism and waveguide together and, therefore, parameters such as coupling length and gap profile may be more readily controlled than hitherto.

In particular prisms having part-cylindrical bases may be used to form couplers of the FIG. 4 variety, with a nearly optimum gap profile. The coupling length and gap profile can be controlled through the radius of curvature of the prism base which may be in the range 100–1000 mm, for example. Alternatively, other curved shapes may be employed for the prism base, for example, parabolic.

Optically flat waveguides may be produced from substrates of increased thickness than hitherto so as to avoid warping. Typically the substrates are presently 0.5–1 mm thick. The expression "optically flat" is taken to mean a flatness of better than approximately $\pi/4$ where $\lambda$ is the wavelength of light being used. In order to obtain the required flatness substrates thicker than usual (several mm thick) can be polished, or substrates thinner than that, such as those presently used, may be bonded to a carrier before polishing. Since the substrate will in this case be fixed to its carrier permanently such an arrangement will not always be practicable.

The example of prism coupler shown in FIG. 7 comprises a prism 20 with a part-cylindrical base, a flat waveguide 21 on a substrate 22 with a carrier 23, and means, indicated schematically by arrow 24, for applying a light pressure sufficient to hold the prism in place. Since only a small force is required to hold the prism and waveguide together, the prism may simply be bonded to the surface of the waveguide by using, for example, an optical epoxy compound, for example epoxy technology inc (USA). "EPO-TER 353 ND". The use of bonding material will increase the refractive index of the gap, it should not exceed the waveguide value, and the evanescent fields within the region of the gap will decay less steeply, in turn relaxing the required tolerance on the layer to be produced.

Because of their simplicity and potential low cost the prism couplers, and methods of making them proposed by the present invention, are suitable for coupling light to and from manufactured integrated optic devices, including Bragg cell optical scanners, spectrum analysers and other signal processing devices.

The advantages of the prism couplers of the present invention include the controllability of the coupling conditions; the need for only a small force to hold the prism and waveguide together; simplicity of the coupler structure; and the manufacture of simple low cost couplers due to bonding of the prism to the waveguide, which manufacture is suitable for automation.

I claim:
1. A prism coupler comprising:
   (1) an optically flat waveguide;
   (2) a prism disposed on the surface of the waveguide, the prism having a surface that is cylindrically curved; and
   (3) means for securing the cylindrically curved surface of the prism to the waveguide.
2. A coupler as claimed in claim 1 wherein said securing means comprises spacers provided between the prism and the waveguide.
3. A coupler as claimed in claim 2 wherein the spacers are formed by means of thin films deposited on the prism and/or the waveguide.
4. A coupler as claimed in claim 2 wherein said spacers are tapered.
5. A coupler as claimed in claim 1 wherein said securing means comprises a bonding compound.
6. A coupler as claimed in claim 5 wherein the bonding compound is an optical epoxy compound.

* * * * *